(12) United States Patent
Imura et al.

(10) Patent No.: US 8,272,699 B2
(45) Date of Patent: Sep. 25, 2012

(54) BRAKE APPARATUS

(75) Inventors: Shinya Imura, Toride (JP); Kenichiro Matsubara, Kasumigaura (JP); Hirotaka Oikawa, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 469 days.

(21) Appl. No.: 12/541,642

(22) Filed: Aug. 14, 2009

(65) Prior Publication Data

US 2010/0066163 A1 Mar. 18, 2010

(30) Foreign Application Priority Data

Sep. 18, 2008 (JP) .................................. 2008-238801

(51) Int. Cl.
*B60T 8/18* (2006.01)
(52) U.S. Cl. .................... 303/9.69; 303/146; 303/186
(58) Field of Classification Search ............. 303/9.62, 303/9.64, 9.69, 9.71, 186, 187, 188, 146, 303/147

See application file for complete search history.

(56) References Cited

U.S. PATENT DOCUMENTS

| | | | | |
|---|---|---|---|---|
| 5,769,510 A | * | 6/1998 | Akuzawa et al. | 303/188 |
| 5,772,289 A | * | 6/1998 | Nakazawa et al. | 303/9.69 |
| 5,855,419 A | * | 1/1999 | Urai et al. | 303/9.69 |
| 6,064,931 A | | 5/2000 | Sawada et al. | |
| 6,280,003 B1 | * | 8/2001 | Oshiro et al. | 303/9.62 |
| 7,097,262 B2 | * | 8/2006 | Sasaki | 303/186 |

FOREIGN PATENT DOCUMENTS

| | | |
|---|---|---|
| JP | 4-85155 A | 3/1992 |
| JP | 6-16117 A | 1/1994 |
| JP | 9-2222 A | 1/1997 |
| WO | WO99/28172 A1 | 6/1999 |

OTHER PUBLICATIONS

Japenese Office Action with English translation dated Jul. 20, 2010 (eight (8) pages).

* cited by examiner

*Primary Examiner* — Thomas J Williams
(74) *Attorney, Agent, or Firm* — Crowell & Moring LLP (57) ABSTRACT

A brake apparatus is provided that can make a ratio between a front wheel braking force and a rear wheel braking force that is actually generated into an arbitrary ratio. This brake apparatus includes a pedal operation detection section that detects a pedal stroke or a brake pedal force produced by a brake pedal operation; a brake caliper that is provided in each wheel of a vehicle and that generates a caliper force that is in accordance with a detection value of the pedal operation detection section; a load estimation section that estimates a load of each of the wheels; and a force generation section that, after judging that braking is performed in a state in which a load difference exists between left and right wheels of the vehicle based on a value that is estimated by the load estimation section, even if the pedal operation detection section detects a pedal stroke or a brake pedal force that is the same as for the braking at a time of judging or for braking prior to the judging, generates a caliper force that is different to the caliper force before the judgment.

13 Claims, 7 Drawing Sheets

BRAKE APPARATUS

BACKGROUND OF THE INVENTION

1. Field of the Invention

The present invention relates to a brake apparatus that performs braking force control of a vehicle.

2. Background Art

Brake apparatuses that perform braking force control having been garnering attention in recent years (see JP Patent Publication (Kokai) No. 9-2222A (1997) (hereunder, referred to as "Patent Document 1")).

According to Patent Document 1, a braking force is controlled so that a difference between a front wheel velocity (=tire radius×front wheel angular velocity) and a rear wheel velocity (=tire radius×rear wheel angular velocity) matches a target value. In order to stably decelerate a vehicle, it is desirable to make a front/rear braking force ratio (ratio between front wheel braking force and rear wheel braking force) equal to a front/rear load ratio (ratio between front wheel load and rear wheel load), that is, to achieve a so-called ideal braking force distribution (reference literature: "Automotive Technology Handbook (First Volume), Fundamentals and Theory" pp. 141-142 (published by Society of Automotive Engineers of Japan)). According to Patent Document 1, the ideal braking force distribution is achieved by making a target value for a difference between the front wheel velocity and rear wheel velocity 0, and causing the front wheel velocity and the rear wheel velocity to match. This is based on the following principle.

As shown by the following equation, it is known that a braking force F generated by a wheel can be approximated with an equation that is proportional to the product of a wheel load W and a slip ratio S. Here, k is a proportionality constant that is mainly determined according to the type of tire.

$$F = k \cdot W \cdot S \qquad \text{[Equation 1]}$$

The slip ratio S is determined by a wheel travelling velocity V and a wheel velocity (R·ω) (where R is the tire radius, and ω is the wheel angular velocity), and is expressed by the following equation.

$$S = \frac{V - R \cdot \omega}{V} \qquad \text{[Equation 2]}$$

Since the wheel travelling velocity V is approximately equal at the front wheels and rear wheels, if the wheel velocity (R·ω) becomes equal for the front wheels and rear wheels, then the slip ratio S will also be approximately equal for the front wheels and rear wheels. When the slip ratio S is equal for the front wheels and rear wheels, then based on equation 1, the front/rear braking force ratio is proportional to the front/rear load ratio.

SUMMARY OF THE INVENTION

However, according to the method described in Patent Document 1, although the front/rear braking force ratio can be made equal to the front/rear load ratio, the front/rear braking force ratio cannot be made an arbitrary ratio. Although either a front wheel braking force or a rear wheel braking force can be made larger in comparison to the ideal braking force distribution by making a target value for a difference between the front wheel velocity and the rear wheel velocity a value that is not 0, the ratio between a front wheel braking force and a rear wheel braking force that is actually generated at that time is not known. Hence, a braking force distribution control (reference literature: "Automotive Technology Handbook (First Volume), Fundamentals and Theory" pp. 274-278 (published by Society of Automotive Engineers of Japan)) or a yaw moment control (ibid pp. 287-289) or the like for stabilizing vehicle behavior cannot be performed accurately.

An object of the present invention is to provide a brake apparatus that can make a ratio between a front wheel braking force and a rear wheel braking force that are actually generated an arbitrary ratio.

To solve the above described problem, one preferred form of the present invention is as follows.

The present brake apparatus comprises a pedal operation detection section that detects a pedal stroke or a brake pedal force produced by a brake pedal operation; a brake caliper that is provided in each wheel of a vehicle and that generates a caliper force that is in accordance with a detection value of the pedal operation detection section; a load estimation section that estimates a load of each of the wheels; and a force generation section that, after judging that braking is performed in a state in which there is a load difference between left and right wheels of the vehicle based on a value that is estimated by the load estimation section, even if the pedal operation detection section detects a pedal stroke or a brake pedal force that is the same as for the braking at a time of the judging or for braking prior to the judging, generates a caliper force that is different to the caliper force before the judgment.

According to the present invention, a brake apparatus can be provided that can make a ratio between a front wheel braking force and a rear wheel braking force that are actually generated an arbitrary ratio.

DESCRIPTION OF SYMBOLS

1*a*, 1*b*, 1*c*, 1*d* wheel
2*a*, 2*b*, 2*c*, 2*d* wheel angular velocity detection section
3 yaw rate detection section
4 wheel load estimation section
5 braking force target value calculation section
6 front/rear braking force correction value calculation section 7 front-wheel left/right braking force correction value calculation section
8 rear-wheel left/right braking force correction value calculation section
9 braking force command value calculation section
10a, 10b, 10c, 10d braking force generation section

DETAILED DESCRIPTION OF THE PREFERRED EMBODIMENTS

Figure 1:
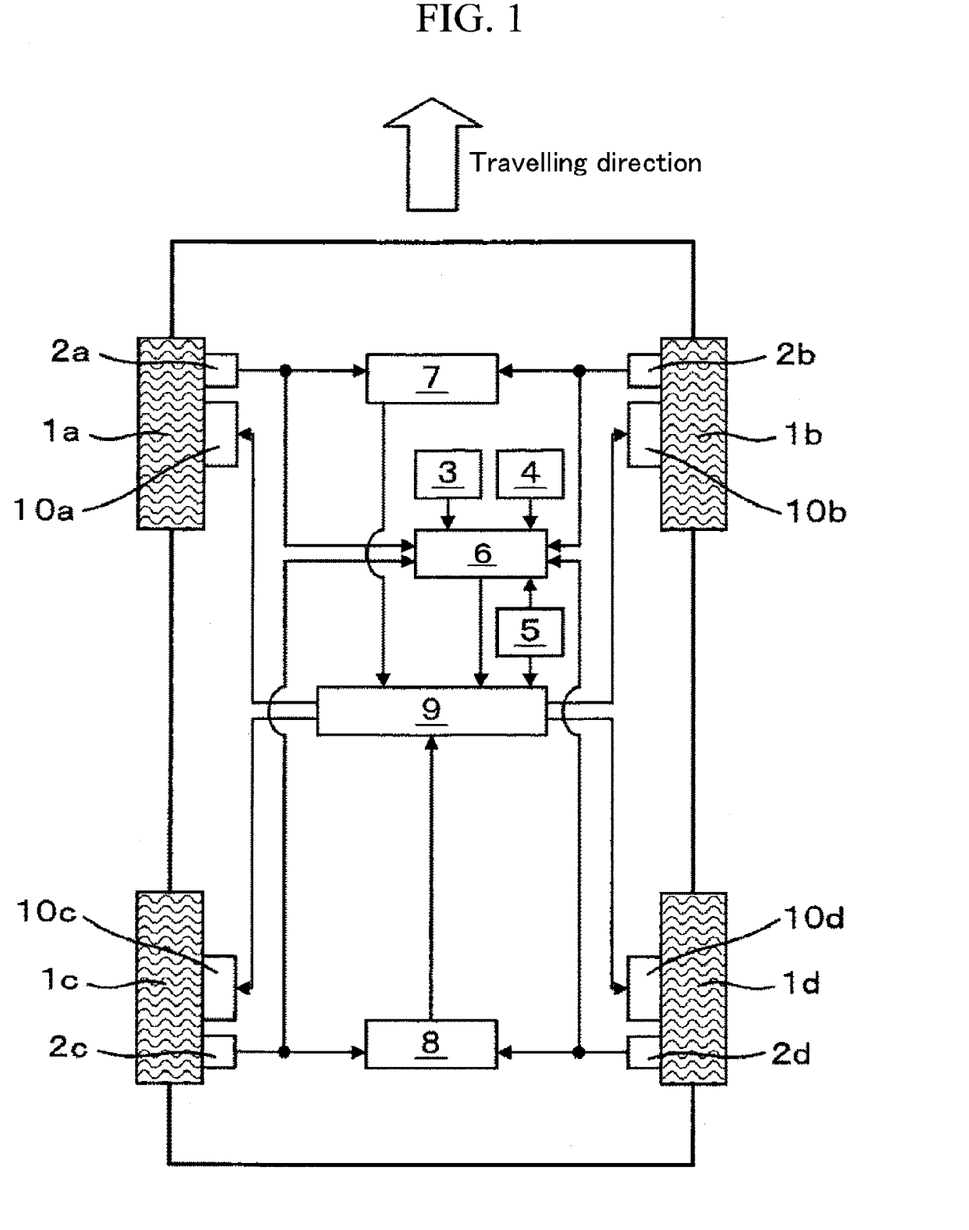
FIG. 1 is a view that shows a configuration example of a vehicle.

FIG. 1 is a view that shows a configuration example of a vehicle.

The vehicle shown in FIG. 1 includes wheels 1a, 1b, 1c, and 1d; wheel angular velocity detection sections 2a, 2b, 2c, and 2d; a yaw rate detection section 3; a wheel load estimation section 4; a braking force target value calculation section 5; a front/rear braking force correction value calculation section 6; a front-wheel left/right braking force correction value calculation section 7; a rear-wheel left/right braking force correction value calculation section 8; a braking force command value calculation section 9; and braking force generation sections 10a, 10b, 10c, and 10d.

The wheel load estimation section 4, braking force target value calculation section 5, front/rear braking force correction value calculation section 6, front-wheel left/right braking force correction value calculation section 7, rear-wheel left/right braking force correction value calculation section 8, and braking force command value calculation section 9 may be constituted in an integrated manner by a single computer, or may be constituted by a plurality of computers.

The wheel angular velocity detection sections 2a, 2b, 2c, and 2d detect angular velocities ωa, ωb, ωc, and ωd of wheels 1a, 1b, 1c, and 1d, and are constituted by a rotary sensor that is mounted to these wheels or to an axle of these wheels.

The yaw rate detection section 3 detects a yaw rate (yaw angular velocity) γ (counterclockwise rotation as viewed from above is positive) of the vehicle, and is constituted by a gyro sensor.

The wheel load estimation section 4 calculates loads (ground contact loads) Wa, Wb, Wc, and Wd of the wheels 1a, 1b, 1c, and 1d based on a front/rear acceleration Ax (acceleration direction is positive) and a lateral acceleration Ay (left direction is positive) of the vehicle using the following equations, and is constituted by a computer. Here, Wsa, WSb, WSc, and WSd denote loads of the wheels 1a, 1b, 1c, 1d when the vehicle is static, g denotes the gravitational acceleration, H denotes the height of the gravitational center of the vehicle, L denotes the wheel base, Df denotes the front axle thread, and Dr denotes the rear axle thread. These values are previously set for each vehicle type.

$$Wa = Wsa - (Wsa + Wsc) \cdot \frac{H}{L} \cdot \frac{Ax}{g} - (Wsa + Wsb) \cdot \frac{H}{Df} \cdot \frac{Ay}{g} \quad \text{[Equation 3]}$$

$$Wb = Wsb - (Wsb + Wsd) \cdot \frac{H}{L} \cdot \frac{Ax}{g} + (Wsa + Wsb) \cdot \frac{H}{Df} \cdot \frac{Ay}{g} \quad \text{[Equation 4]}$$

$$Wc = Wsc + (Wsa + Wsc) \cdot \frac{H}{L} \cdot \frac{Ax}{g} - (Wsc + Wsd) \cdot \frac{H}{Dr} \cdot \frac{Ay}{g} \quad \text{[Equation 5]}$$

$$Wd = Wsd + (Wsb + Wsd) \cdot \frac{H}{L} \cdot \frac{Ax}{g} + (Wsc + Wsd) \cdot \frac{H}{Dr} \cdot \frac{Av}{g} \quad \text{[Equation 6]}$$

In this connection, the lateral acceleration Ay is detected with an unshown lateral acceleration sensor. The front/rear acceleration Ax may be detected with an unshown front/rear acceleration sensor, or may be calculated by performing time differentiation with respect to a mean value of the wheel velocity as in the following equation.

$$Ax = \frac{d}{dt}\left\{\frac{R \cdot (\omega a + \omega b + \omega c + \omega d)}{4}\right\} \quad \text{[Equation 7]}$$

Further, a wheel load detection section may be used instead of using the wheel load estimation section 4. The wheel load detection section detects the wheel loads Wa, Wb, Wc, and Wd, and is constituted by a displacement sensor or a strain sensor that is mounted to these wheels or to suspensions of these wheels.

The braking force target value calculation section 5 determines a total braking force target value (total braking force demanded by the driver) TFv based on a brake pedal stroke amount or a master cylinder pressure, and uses the following equations to calculate a front wheel braking force target value (target value of total braking force of front wheels 1a and 1b) TFf and a rear wheel braking force target value (target value of total braking force of rear wheels 1c and 1d) TFr. The braking force target value calculation section 5 is constituted by a computer. Here Wv denotes the total load of all wheels, and is given by Wv=Wsa+WSb+WSc+WSd.

$$TFf=(Wsa+Wsb+TFv \cdot H/L) \cdot TFv/Wv \quad \text{[Equation 8]}$$

$$TFr=(Wsc+Wsd-TFv \cdot H/L) \cdot TFv/Wv \quad \text{[Equation 9]}$$

Further, although a target value is decided so that the front/rear braking force ratio becomes the ideal braking force distribution according to equation 8 and equation 9, a configuration may also be adopted in which, in consideration of the vehicle behavior stability, the front wheel braking force target value TFf is made greater than the value of equation 8 and the rear wheel braking force target value TFr is made smaller than the value of equation 9 so that the front wheels lock first.

The front/rear braking force correction value calculation section 6 is constituted by a computer, and calculates a front wheel braking force correction value CFf and a rear wheel braking force correction value CFr based on the wheel angular velocities ωa, ωb, ωc, and ωd, the yaw rate γ, the wheel loads Wa, Wb, Wc, and Wd, the front wheel braking force target value TFf, and the rear wheel braking force target value TFr. The front/rear braking force correction value calculation section 6 is described in detail later.

The front-wheel left/right braking force correction value calculation section 7 is constituted by a computer, and calculates a front-wheel left/right braking force correction value CFflr for reducing a left/right difference in the front wheels braking force based on the front wheels angular velocities ωa and ωb. This calculation is performed during a period in which previously set conditions for straight-ahead braking are being satisfied, and when the driver stopped braking after the conditions are no longer satisfied. The straight-ahead braking conditions are, for example, a time when deceleration is 1 m/s² or more, an absolute value of lateral acceleration is 0.2 m/s² or less, and the left/right braking force distribution control or the yaw moment control is not being performed. First, during a period in which the straight-ahead braking conditions are being satisfied, the front-wheel left/right braking force correction value calculation section 7 uses the following equation to calculate an update value ΔCFflr for the front-wheel left/right braking force correction value. In this connection, kflr denotes a front-wheel left/right braking force correction value update coefficient, and is previously set so that the left/right difference in the front wheel braking force decreases sufficiently. Here, t denotes time, and a time that satisfies the straight-ahead braking condition is taken as 0.

$$\Delta CFflr = \frac{1}{t} \cdot \int_0^t \{kflr \cdot (\omega a - \omega b)\} dt \qquad \text{[Equation 10]}$$

Subsequently, the straight-ahead braking conditions are no longer satisfied, and thereafter, when the driver stops braking, the front-wheel left/right braking force correction value CFflr is updated as shown by the following equation. The updated correction value is used at the next braking.

$$CFflr \leftarrow CFflr + \Delta CFflr \qquad \text{[Equation 11]}$$

The rear-wheel left/right braking force correction value calculation section 8 is constituted by a computer, and calculates a rear-wheel left/right braking force correction value CFrlr for reducing a left/right difference in the rear wheel braking force based on the rear wheel angular velocities ωc and ωd. For this calculation, similarly to the front wheels, first an update value ΔCFrlr of the rear-wheel left/right braking force correction value is calculated using the following equation during a period in which the straight-ahead braking conditions are being satisfied. In this connection, krlr denotes a rear-wheel left/right braking force correction value update coefficient, and is previously set so that the left/right difference in the rear wheel braking force decreases sufficiently.

$$\Delta CFrlr = \frac{1}{t} \cdot \int_0^t \{krlr \cdot (\omega c - \omega d)\} dt \qquad \text{[Equation 12]}$$

Subsequently, the straight-ahead braking conditions are no longer satisfied, and thereafter, when the driver stops braking, the rear-wheel left/right braking force correction value CFrlr is updated as shown by the following equation. The updated correction value is used at the next braking.

$$CFrlr \leftarrow CFrlr + \Delta CFrlr \qquad \text{[Equation 13]}$$

The braking force command value calculation section 9 is constituted by a computer, and uses the following equations to calculate braking force command values TFa, TFb, TFc, and TFd of the wheels 1a, 1b, 1c, and 1d based on the front wheel braking force target value TFf, the rear wheel braking force target value TFr, the front wheel braking force correction value CFf, the rear wheel braking force correction value CFr, the front-wheel left/right braking force correction value CFflr, and the rear-wheel left/right braking force correction value CFrlr.

$$TFa = TFf/2 + CFf + CFflr \qquad \text{[Equation 14]}$$

$$TFb = TFf/2 + CFf - CFflr \qquad \text{[Equation 15]}$$

$$TFc = TFr/2 + CFr + CFrlr \qquad \text{[Equation 16]}$$

$$TFd = TFr/2 + CFr - CFrlr \qquad \text{[Equation 17]}$$

The braking force generation sections 10a, 10b, 10c, and 10d generate a braking force in the wheels 1a, 1b, 1c, and 1d based on braking force command values TFa, TFb, TFc, and TFd. For example, the braking force generation sections 10a, 10b, 10c, and 10d are constituted by a hydraulic apparatus, a brake caliper, and a brake rotor. The braking force generation sections 10a, 10b, 10c, and 10d may also be constituted by an electric motor.

Figure 2:
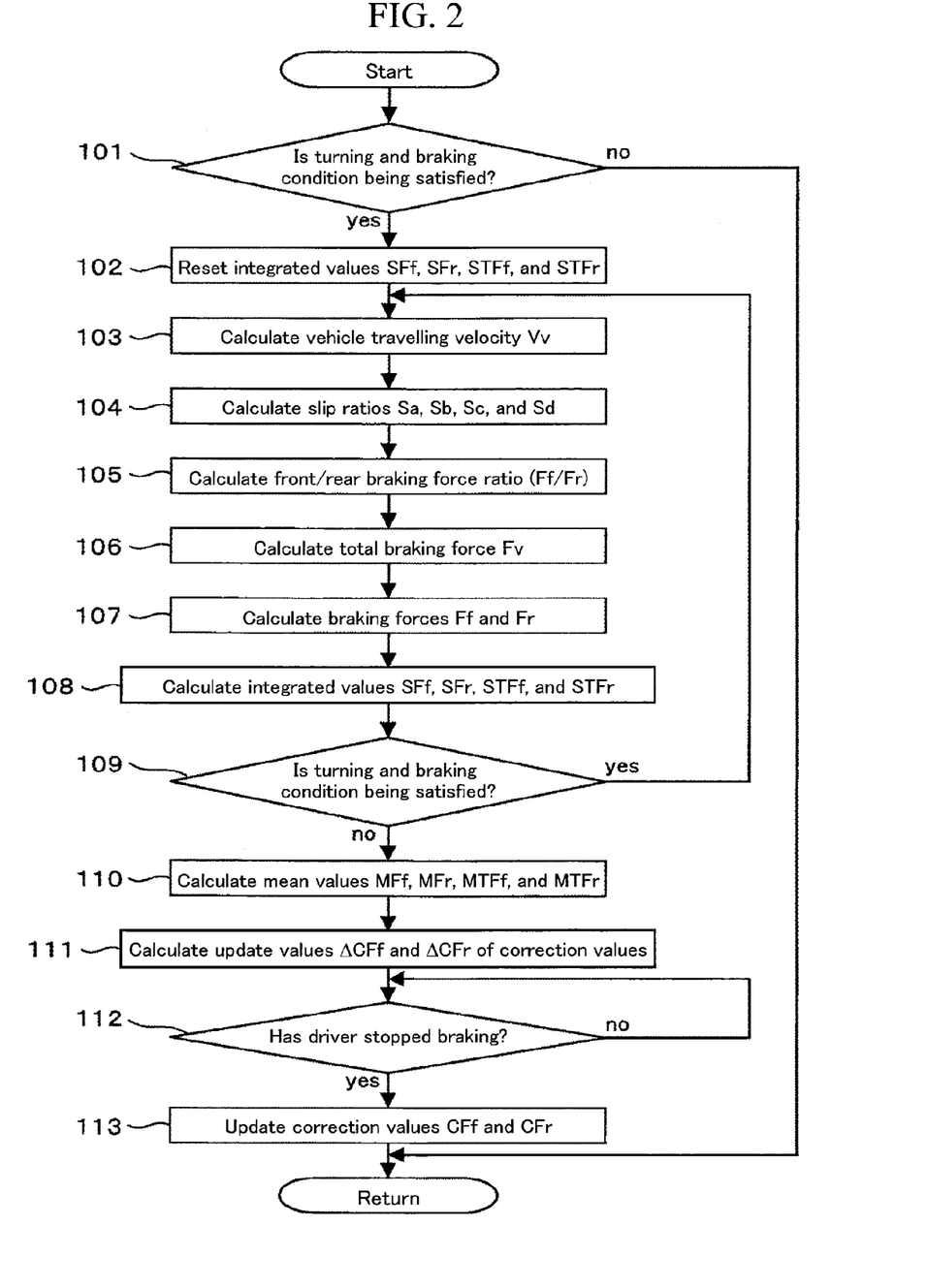
FIG. 2 is an example of a flowchart of calculations performed by a front/rear braking force correction value calculation section 6.

FIG. 2 is a view that illustrates an example of a flowchart of calculations performed by the front/rear braking force correction value calculation section 6.

In step 101, the front/rear braking force correction value calculation section 6 judges whether or not to calculate a front/rear braking force correction value. The judgment condition is previously set so that the front/rear braking force correction value can be accurately calculated when performing turning and braking. For example, the condition is taken as a time when deceleration is 1 m/s$^2$ or more, an absolute value of lateral acceleration is 1 m/s$^2$ or more, and the left/right braking force distribution control or the yaw moment control is not being performed. If the judgment condition is satisfied, the processing proceeds to step 102. If the judgment condition is not satisfied, calculation of the front/rear braking force correction value is not performed.

In this connection, taking into consideration that the detection accuracy with respect to the wheel angular velocity is low when the vehicle speed is low, a condition that the vehicle speed is greater than or equal to a threshold value (for example, 20 km/h or more) may be added to the judgment condition of step 101. Further, taking into consideration that equation 30 and equation 31 that are described later no longer hold true when a left/right difference in the braking force is large, a condition that an absolute value of the update value ΔCFflr for the front-wheel left/right braking force correction value or the update value ΔCFrlr for the rear-wheel left/right braking force correction value is less than or equal to a threshold value (for example, less than or equal to 20 N) may be added to the judgment condition of step 101.

In step 102, a front wheel braking force integrated value SFf, a rear wheel braking force integrated value SFr, an integrated value STFf of the front wheel braking force target value, and an integrated value STFr of the rear wheel braking force target value are reset (substituted with 0).

In step 103, the vehicle travelling velocity Vv is calculated using the following equation.

$$Vv = \frac{Vv1 + Vv2}{2} \qquad \text{[Equation 18]}$$

$$Vv1 = \frac{Wa \cdot (R \cdot \omega a + Df \cdot \gamma/2) - Wb \cdot (R \cdot \omega b - Df \cdot \gamma/2)}{Wa - Wb}$$

$$Vv2 = \frac{Wc \cdot (R \cdot \omega c + Dr \cdot \gamma/2) - Wd \cdot (R \cdot \omega d - Dr \cdot \gamma/2)}{Wc - Wd}$$

In this connection, equation 18 is obtained in the following manner.

The braking forces Fa, Fb, Fc, and Fd of the wheels 1a, 1b, c, and 1d are expressed by the following equations using the loads Wa, Wb, Wc, and Wd and the slip ratios Sa, Sb, Sc, and Sd.

$$Fa = k \cdot Wa \cdot Sa \qquad \text{[Equation 19]}$$

$$Fb = k \cdot Wb \cdot Sb \qquad \text{[Equation 20]}$$

$$Fc = k \cdot Wc \cdot Sc \qquad \text{[Equation 21]}$$

$$Fd = k \cdot Wd \cdot Sd \qquad \text{[Equation 22]}$$

The slip ratios Sa, Sb, Sc, and Sd are decided according to the travelling velocities Va, Vb, Vc, and Vd of the wheels 1a, 1b, 1c, and 1d and the angular velocities ωa, ωb, ωc, and ωd, and are expressed by the following equations.

$$Sa = \frac{Va - R \cdot \omega a}{Va}$$ [Equation 23]

$$Sb = \frac{Vb - R \cdot \omega b}{Vb}$$ [Equation 24]

$$Sc = \frac{Vc - R \cdot \omega c}{Vc}$$ [Equation 25]

$$Sd = \frac{Vd - R \cdot \omega d}{Vd}$$ [Equation 26]

The wheel travelling velocities Va, Vb, Vc, and Vd are expressed by the following equations.

$$Va = Vv - Df \cdot \gamma/2$$ [Equation 27]

$$Vb = Vv + Df \cdot \gamma/2$$ [Equation 28]

$$Vc = Vv - Dr \cdot \gamma/2$$ [Equation 29]

$$Vd = Vv + Dr \cdot \gamma/2$$ [Equation 30]

Unless a left/right braking force distribution control is being performed, the front wheel braking forces Fa and Fb are approximately equal and the rear wheel braking forces Fc and Fd are approximately equal, and hence, based on equation 19 to equation 22, the following equation is established.

$$Wa \cdot Sa = Wb \cdot Sb$$ [Equation 31]

$$Wc \cdot Sc = Wd \cdot Sd$$ [Equation 32]

When equation 23 and equation 24 are substituted into equation 31, the following equation is obtained.

$$Wa \cdot \frac{Va - R \cdot \omega a}{Va} = Wb \cdot \frac{Vb - R \cdot \omega b}{Vb}$$ [Equation 33]

When denominators Va and Vb of equation 33 are approximate to Va≈Vb, the following equation is obtained.

$$Wa \cdot (Va - R \cdot \omega a) = Wb \cdot (Vb \cdot R \cdot \omega b)$$ [Equation 34]

When equation 27 and equation 28 are substituted into equation 34, the following equation is obtained.

$$Vv = \frac{Wa \cdot (R \cdot \omega a + Df \cdot \gamma/2) - Wb \cdot (R \cdot \omega b - Df \cdot \gamma/2)}{Wa - Wb}$$ [Equation 35]

When a calculation that is similar to that for the front wheels is performed with respect to the rear wheels, the following equation can be obtained.

$$Vv = \frac{Wc \cdot (R \cdot \omega c + Dr \cdot \gamma/2) - Wd \cdot (R \cdot \omega d - Dr \cdot \gamma/2)}{Wc - Wd}$$ [Equation 36]

Because many approximations have been included in the calculations up this point, the vehicle travelling velocity Vv calculated with equation 35 and the vehicle travelling velocity Vv calculated with equation 36 normally do not match completely. Therefore, in step 103, the mean value of equation 35 and equation 36 is regarded as the vehicle travelling velocity Vv, and is calculated using equation 18.

In step 104, the slip ratios Sa, Sb, Sc, and Sd are calculated using equation 23 to equation 26.

In step 105, the front/rear braking force ratio (Ff/Fr) is calculated using the following equation.

$$\frac{Ff}{Fr} = \frac{Wa \cdot Sa + Wb \cdot Sb}{Wc \cdot Sc + Wd \cdot Sd}$$ [Equation 37]

In step 106, the total braking force Fv is calculated using the following equation. Here, M denotes vehicle weight, and is previously set for each type of vehicle.

$$Fv = -M \cdot Ax$$ [Equation 38]

In step 107, the front wheel braking force Ff and the rear wheel braking force Fr are calculated using the following equations.

$$Ff = \frac{Fv}{Fr/Ff + 1}$$ [Equation 39]

$$Fr = \frac{Fv}{Ff/Fr + 1}$$ [Equation 40]

In step 108, as shown in the following equations, the front wheel braking force Ff, the rear wheel braking force Fr, the front wheel braking force target value TFf, and the rear wheel braking force target value TFr are integrated to calculate the front wheel braking force integrated value SFf, the rear wheel braking force integrated value SFr, the integrated value STFf of the front wheel braking force target value, and the integrated value STFr of the rear wheel braking force target value. Here, Δt denotes an operation period of the front/rear braking force correction value calculation section 6.

$$SFf \leftarrow SFf + Ff \cdot \Delta t$$ [Equation 41]

$$SFr \leftarrow SFr + Fr \cdot \Delta t$$ [Equation 42]

$$STFf \leftarrow STFf + TFf \cdot \Delta t$$ [Equation 43]

$$STFr \leftarrow STFr + TFr \cdot \Delta t$$ [Equation 44]

In step 109, a judgment is made using the same judgment condition as in step 101. If the judgment condition is satisfied, the processing returns to step 103. If the judgment condition is not satisfied, the processing advances to step 110.

In step 110, as shown by the following equations, the front/rear braking force correction value calculation section 6 divides the values for the front wheel braking force integrated value SFf, the rear wheel braking force integrated value SFr, the integrated value STFf of the front wheel braking force target value, and the integrated value STFr of the rear wheel braking force target value by the time t in which the operations of steps 103 to 108 have been performed, to thereby calculate a time mean value MFf of the front wheel braking force, a time mean value MFr of the rear wheel braking force, a time mean value MTFf of the front wheel braking force target value, and a time mean value MTFr of the rear wheel braking force target value.

$$MFf = SFf/t$$ [Equation 45]

$$MFr = SFr/t$$ [Equation 46]

$$MTFf = STFf/t$$ [Equation 47]

$$MTFr = STFr/t$$ [Equation 48]

In step 111, using the following equations, an update value ΔCFf for the front wheel braking force correction value and an update value ΔCFr for the rear wheel braking force correction value are calculated. In this connection, kf denotes a front wheel braking force correction value update coefficient and kr denotes a rear wheel braking force correction value update coefficient. Both of these coefficients are previously set to a numerical value that is greater than 0 and less than or equal to 1.

$$\Delta CFf = kf \cdot (MTFf - MFf) \qquad \text{[Equation 49]}$$

$$\Delta CFr = kr \cdot (MTFr - MFr) \qquad \text{[Equation 50]}$$

In step 112, a judgment is made as to whether or not the driver has stopped braking. This judgment is made by determining whether or not the brake pedal stroke amount is 0 or whether or not the master cylinder pressure is 0. If the driver has stopped braking, the process advances to step 113, and if not, step 112 is repeated until the driver stops braking.

In step 113, the front wheel braking force correction value CFf and the rear wheel braking force correction value CFr are updated in the manner shown by the following equations, and the updated values are output from the front/rear braking force correction value calculation section 6. The updated correction values are used at the next braking.

$$CFf \leftarrow CFf + \Delta CFf \qquad \text{[Equation 51]}$$

$$CFr \leftarrow CFr + \Delta CFr \qquad \text{[Equation 52]}$$

An example of the operations of the front/rear braking force correction value calculation section 6 will now be explained using FIG. 3 to FIG. 10.

Figure 3:
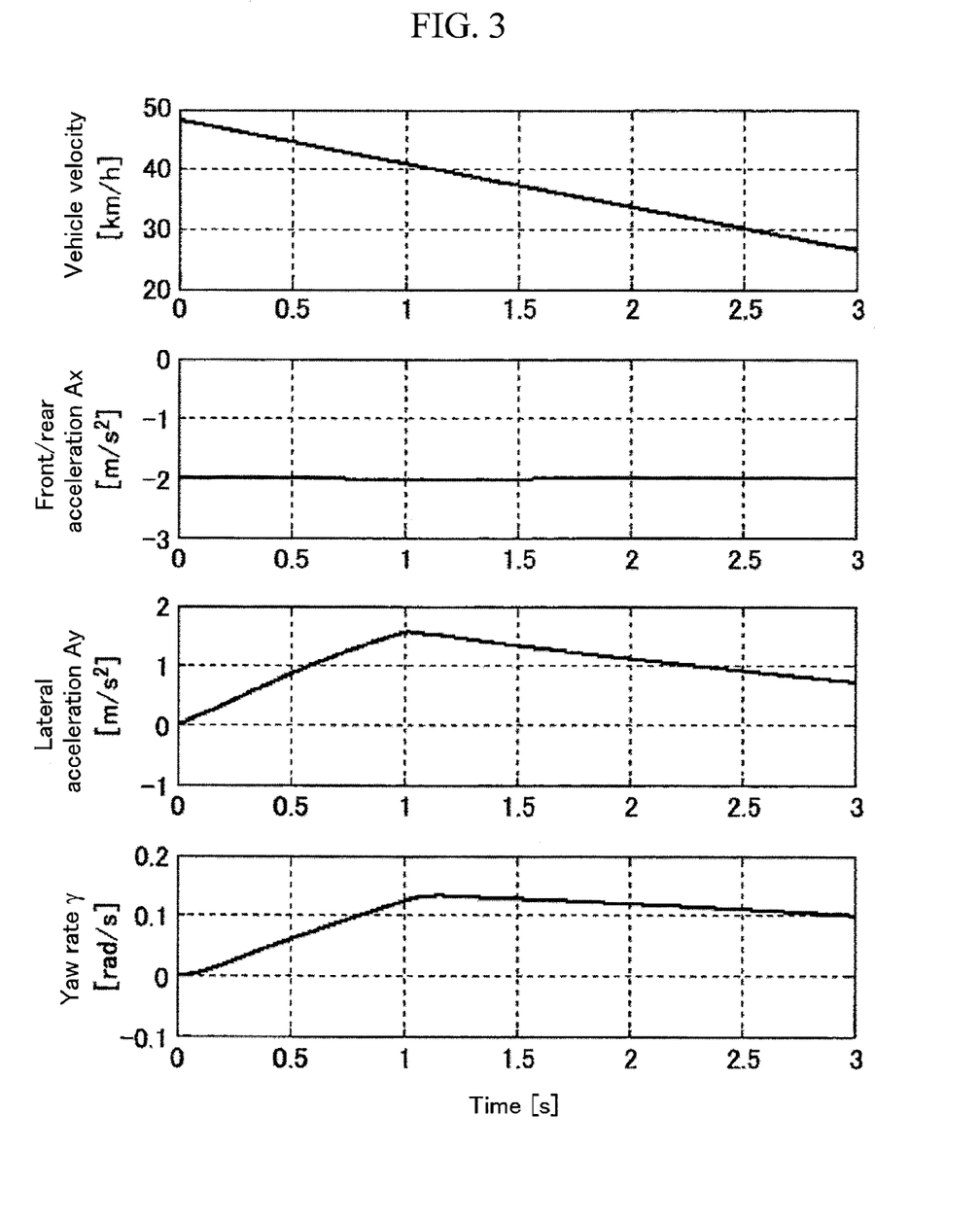
FIG. 3 is a view that illustrates an example of a vehicle speed, a front/rear acceleration Ax, a lateral acceleration Ay, and a yaw rate γ.

FIG. 3 is a view that illustrates the vehicle speed, front/rear acceleration Ax, lateral acceleration Ay, and yaw rate γ when the driver starts to turn the steering wheel while stepping on the brake.

Figure 4:
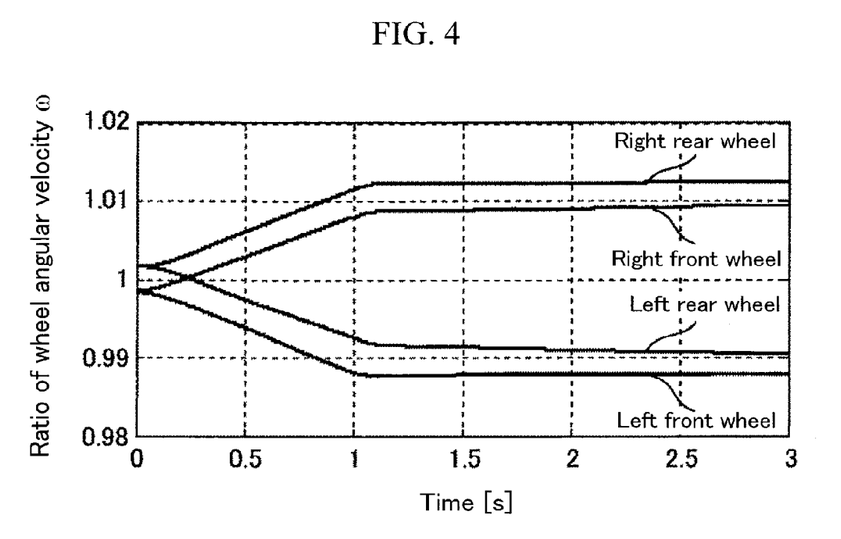
FIG. 4 is a view that illustrates an example of values obtained by dividing wheel angular velocities ωa, ωb, ωc, and ωd by a mean wheel angular velocity.

FIG. 4 is a view that illustrates values obtained by dividing the wheel angular velocities ωa, ωb, ωc, and ωd at that time by the mean wheel angular velocity (=(ωa+ωb+ωc+ωd)/4) to facilitate understanding of the differences between the angular velocities of each wheel.

Figure 5:
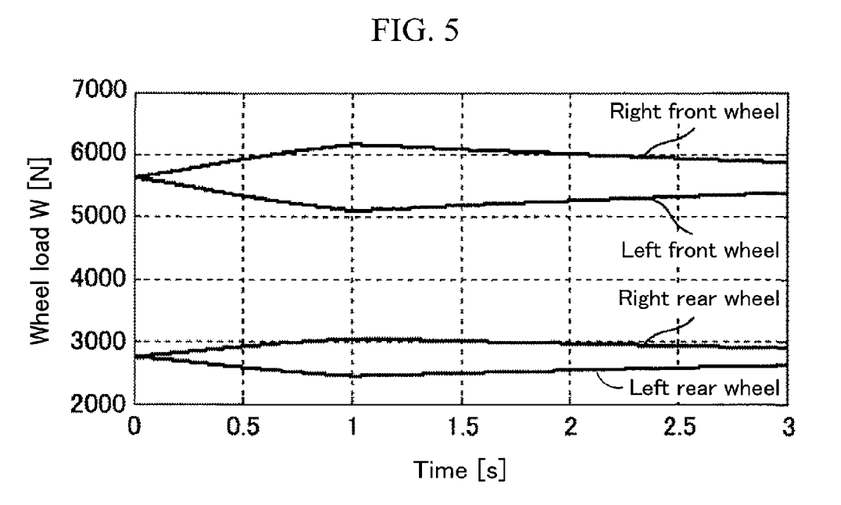
FIG. 5 is a view that illustrates an example of calculated wheel loads Wa, Wb, Wc, and Wd.

FIG. 5 is a view that illustrates the wheel loads Wa, Wb, Wc, and Wd at that time that are calculated by the wheel load estimation section 4.

The front/rear braking force correction value calculation section 6 calculates the vehicle travelling velocity Vv, the slip ratios Sa, Sb, Sc, and Sd, the front/rear braking force ratio (Ff/Fr), the total braking force Fv, the front wheel braking force Ff, and the rear wheel braking force Fr and the like during a period in which a preset turning and braking condition is being satisfied. According to the present example, the turning and braking condition is that an absolute value of the lateral acceleration is 1 m/s² or more. Returning to FIG. 3, it is found that a period in which the condition is being satisfied is from 0.6 seconds to 2.3 seconds, and thus the aforementioned calculation is performed during this period.

Figure 6:
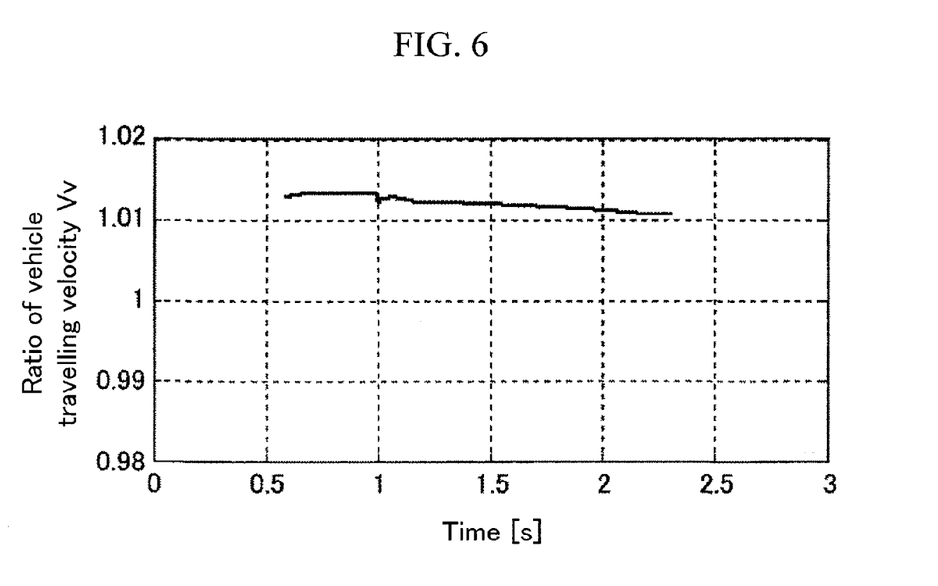
FIG. 6 is a view that illustrates an example of values obtained by dividing a calculated vehicle travelling velocity Vv by a mean wheel velocity.

FIG. 6 is a view that illustrates a value obtained by dividing the calculated vehicle travelling velocity Vv by the mean wheel velocity (=R·(ωa+ωb+ωc+ωd)/4) to facilitate comparison with FIG. 4.

Figure 7:
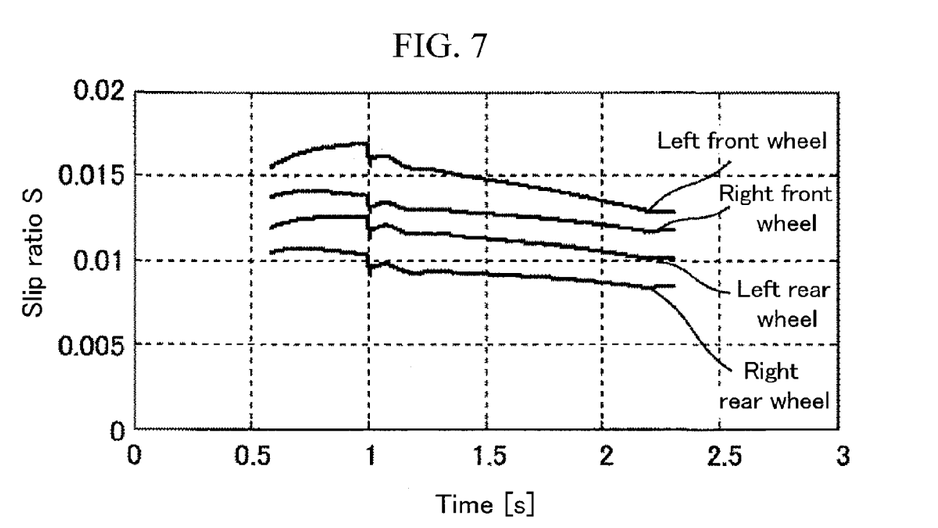
FIG. 7 is a view that illustrates an example of calculated slip ratios Sa, Sb, Sc, and Sd.

FIG. 7 is a view that shows the calculated slip ratios Sa, Sb, Sc, and Sd.

Figure 8:
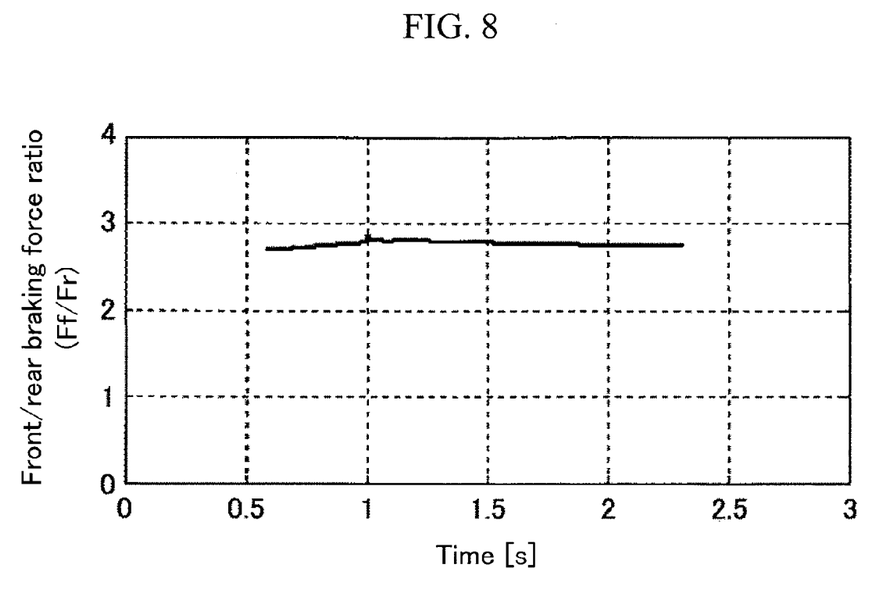
FIG. 8 is a view that illustrates an example of a calculated front/rear braking force ratio (Ff/Fr).

FIG. 8 is a view that shows the calculated front/rear braking force ratio (Ff/Fr).

Figure 9:
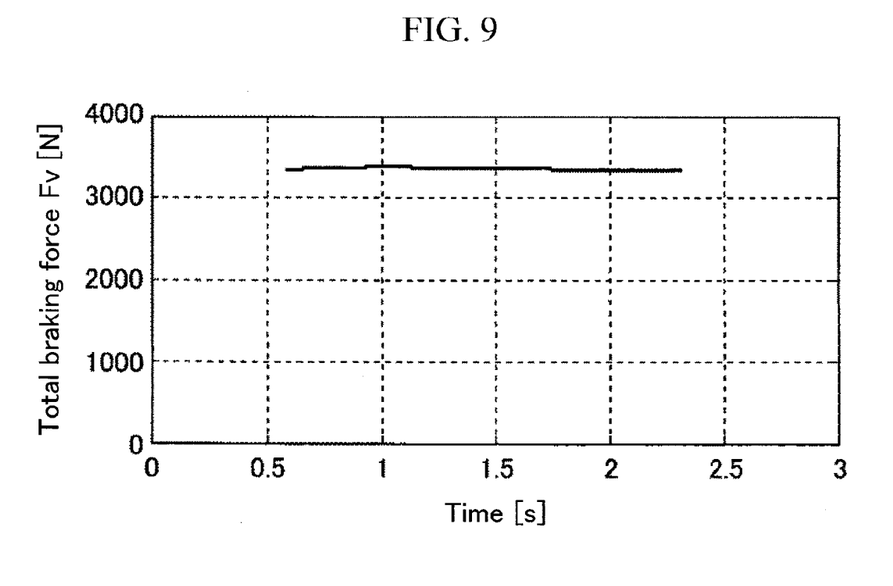
FIG. 9 is a view that illustrates an example of a calculated total braking force Fv.

FIG. 9 is a view that shows the calculated total braking force Fv.

Figure 10:
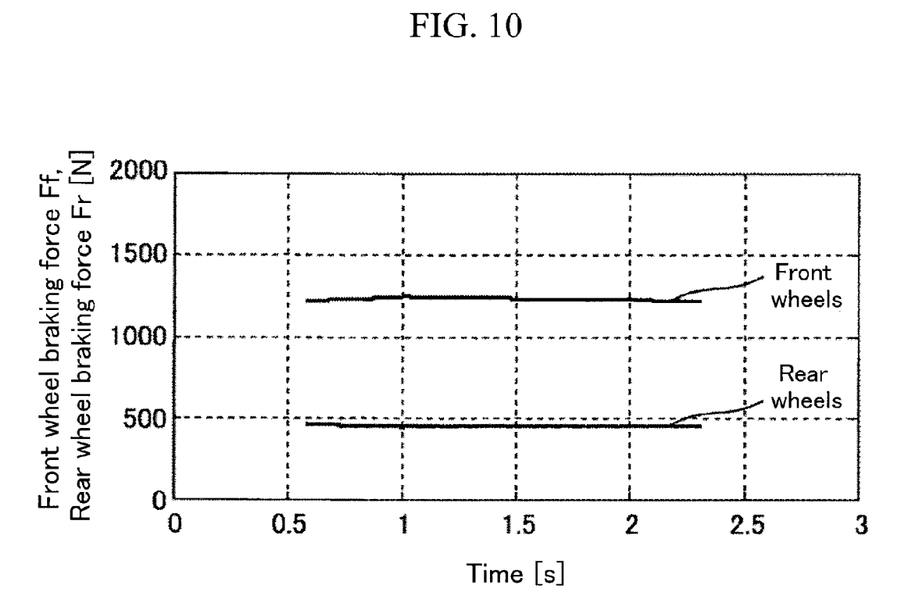
FIG. 10 is a view that illustrates an example of a calculated front wheel braking force Ff and rear wheel braking force Fr.

FIG. 10 is a view that shows the calculated front wheel braking force Ff and rear wheel braking force Fr.

When the straight-ahead braking condition is no longer satisfied, the front/rear braking force correction value calculation section 6 calculates the time mean value MFf of the front wheel braking force, the time mean value MFr of the rear wheel braking force, the time mean value MTFf of the front wheel braking force target value, the time mean value MTFr of the rear wheel braking force target value, the update value ΔCFf of the front wheel braking force correction value, and the update value ΔCFr of the rear wheel braking force correction value.

The calculated results for the time mean value MFf of the front wheel braking force and the time mean value MFr of the rear wheel braking force are MFf=1228N and MFr=445N. Since the time mean value of the front wheel braking force and the time mean value of the rear wheel braking force that are actually generated in this period are 1236N and 438N, respectively, it is found that these values can be estimated almost precisely.

Further, the calculated results for the time mean value MTFf of the front wheel braking force target value and the time mean value MTFr of the rear wheel braking force target value are MTFf=1200N and MTFr=400N.

Further, according to the present example, the values for the front wheel braking force correction value update coefficient kf and the rear wheel braking force correction value update coefficient kr are kf=kr=0.5. The values for the update value ΔCFf of the front wheel braking force correction value and the update value ΔCFr of the rear wheel braking force correction value are ΔCFf=0.5×(1200N−1228N)=−14N, and ΔCFr=0.5×(400N−445N)=−22.5N.

Thereafter, after the driver has stopped braking, the calculated ΔCFf and ΔCFr are added to the front wheel braking force correction value CFf and the rear wheel braking force correction value CFr that have been used up to this point, and the resulting values are output from the front/rear braking force correction value calculation section 6.

As described above, according to the present embodiment, a ratio between a front wheel braking force and a rear wheel braking force that are actually generated can be made an arbitrary ratio. Thus, for example, a braking force distribution control or a yaw moment control for stabilizing the vehicle behavior can be accurately performed.

What is claimed is:

1. A brake apparatus, comprising:
 a wheel angular velocity detection section that detects an angular velocity of a wheel;
 a load estimation section that estimates a load of a wheel;
 a target value calculation section that calculates a target value for a braking force of at least one member of the group consisting of front wheels and rear wheels;
 a front/rear braking force correction value calculation section that estimates a front/rear braking force ratio that is a ratio between a front wheel braking force and a rear wheel braking force based on the angular velocity and the load at a time of braking, and calculates a front/rear braking force correction value for controlling a braking force of at least one member of the group consisting of front wheels and rear wheels based on the front/rear braking force ratio;
 a command value calculation section that calculates a braking force command value based on the braking force target value and the front/rear braking force correction value; and
 a braking force generation section that generates a braking force at a wheel based on the braking force command value, wherein the front/rear braking force correction value calculation section estimates a total braking force of all wheels based on the front/rear braking force ratio and a deceleration of the vehicle, and calculates the front/rear braking force correction value based on the front/rear braking force ratio and the total braking force.

2. The brake apparatus according to claim 1, further comprising:
a left/right braking force correction value calculation section that calculates a left/right braking force correction value for reducing a left/right difference in a braking force of at least one member of the group consisting of front wheels and rear wheels based on the angular velocity at a time of braking;
wherein the command value calculation section calculates the braking force command value based on the braking force target value, the front/rear braking force correction value, and the left/right braking force correction value.

3. The brake apparatus according to claim 1, comprising a load detection section that detects the load, instead of the load estimation section.

4. The brake apparatus according to claim 1, wherein the target value calculation section calculates the braking force target value in accordance with an operation of a brake pedal.

5. The brake apparatus according to claim 1, wherein the target value calculation section calculates the braking force target value of each wheel for stabilizing a vehicle behavior.

6. The brake apparatus according to claim 1, wherein the load estimation section calculates the load based on a static wheel load, a front/rear acceleration sensor value, and a lateral acceleration sensor value.

7. The brake apparatus according to claim 1, wherein the load estimation section comprises a load detection section that detects the load.

8. The brake apparatus according to claim 1, wherein the load estimation section sets the load in advance.

9. The brake apparatus according to claim 6, wherein the load estimation section sets the static wheel load in advance.

10. The brake apparatus according to claim 6, wherein the load estimation section calculates the static wheel load based on a total driving force that is generated by an engine or a motor and a front/rear acceleration sensor value.

11. The brake apparatus according to claim 6, wherein the load estimation section comprises a front/rear acceleration sensor value detection section that detects the front/rear acceleration sensor value.

12. The brake apparatus according to claim 6, wherein the load estimation section calculates the front/rear acceleration sensor value based on the angular velocity and a road surface inclination angle.

13. A brake apparatus, comprising:
an angular velocity detection section that detects an angular velocity of a wheel;
a yaw rate detection section that detects a yaw rate of a vehicle;
a load estimation section that estimates a load of a wheel;
a target value calculation section that calculates a target value for a braking force of at least one member of the group consisting of front wheels and rear wheels;
a front/rear braking force correction value calculation section that estimates a front/rear braking force ratio that is a ratio between a front wheel braking force and a rear wheel braking force based on the angular velocity, the yaw rate, and the load at a time of turning and braking, and calculates a front/rear braking force correction value for controlling a braking force of at least one member of the group consisting of front wheels and rear wheels based on the front/rear braking force ratio;
a command value calculation section that calculates a braking force command value based on the braking force target value and the front/rear braking force correction value; and
a braking force generation section that generates a braking force at a wheel based on the braking force command value,
wherein the front/rear braking force correction value calculation section estimates a total braking force of all wheels based on the front/rear braking force ratio and a deceleration of the vehicle, and calculates the front/rear braking force correction value based on the front/rear braking force ratio and the total braking force.

* * * * *